3,398,164
POLYAMIDES OF 1,4-BIS(β-AMINOETHYL) BENZENE AND FRACTIONATED POLYMERIC FAT ACIDS
Edgar R. Rogier, Hopkins, Minn., assignor to General Mills, Inc., a corporation of Delaware
No Drawing. Filed July 2, 1963, Ser. No. 292,446
5 Claims. (Cl. 260—404.5)

This invention relates to high molecular weight polyamide compositions and more particularly to polyamide compositions of 1,4-bis-(β-aminoethyl)benzene and fractionated polymeric fat acids. Further, the invention also relates to copolymer polyamide compositions in which certain other dibasic acids or esters, amino acids or other amide forming derivatives are employed in part for the polymeric fat acids.

The polyamides of the present invention, both homopolymer and copolymer compositions, have improved toughness (high tensile strength and high elongation) combined with surprising resistance to water absorption.

It is therefore an object of this invention to provide polyamide compositions having improved toughness.

It is also an object of this invention to provide such polyamide compositions having improved resistance to water absorption.

It is also an object of this invention to provide such compositions utilizing fractionated polymeric fat acids and 1,4-bis-(β-aminoethyl)benzene.

Briefly, the polyamide compositions of the present invention are prepared by reacting 1,4-bis-(aminoethyl)benzene with fractionated polymeric fat acids or mixtures thereof with other dibasic acids, amino acids, or other amide forming derivatives thereof. The time and temperature of reaction may be varied over a considerable range but is usually from 150–300° C. for a period of ½–8 hours, the longer period being employed at the lower temperatures. Essentially, one molar equivalent of amine is employed per molar equivalent of carboxyl group present.

The polymeric fat acids employed in this invention are fractionated polymeric fat acids having an excess of about 95% weight of the dimeric species. The term "polymeric fat acids" as used herein is intended to be generic to polymerized acids obtained from "fat acids." The term "fat acids" is intended to include saturated, ethylenically unsaturated and acetylenically unsaturated, naturally occurring and synthetic, monobasic aliphatic acids containing from 8–24 carbon atoms.

The saturated, ethylenically unsaturated and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the generally low yields of polymeric products, these materials are not currently commercially significant. Suitable saturated fat acids include branched and straight chain acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthraquinone, sulfur dioxide and the like. Suitable monomers include the branched and straight chain, poly- and mono-ethylenically unsaturated acids such as 3-octenoic acid, 11-dodecanoic acid, linderic acid, lauroleic acid, myristoleic acid, tsuzuic acid, palmitoleic acid, gadoleic acid, cetoleic acid, nervonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and poly-unsaturated, are useful monomers for the preparation of the polymeric fat acids. Suitable examples of such materials include 10-undecynoic acid, tariric acid, stearolic acid, behenolic acid and isamic acid.

Because of their ready availability and relative ease of polymerization, oleic and linoleic acid are the preferred starting materials for the preparation of the polymeric fat acids.

It is understood that the term "polymeric fat acids" includes the acids and such other derivatives capable of forming amides in a reaction with a diamine, such as the lower alcohol (alkyl having 1 to 8 carbon atoms) esters of polymeric fat acids.

Having obtained the polymeric fat acids or derivatives as described above, they may then be fractionated, for example, by conventional techniques of distillation or solvent extraction. They may be hydrogenated (before or after distillation) to reduce unsaturation under hydrogen pressure in the presence of a hydrogenation catalyst. Where color and stability of the polymers are particularly important, hydrogenated and fractionated polymeric fat acids are the preferred starting materials.

Typical compositions of commercially available polymeric fat acids, based on unsaturated $C_{18}$ fat acids, are:

$C_{18}$ monobasic acids ("monomer") 5–15% by weight;
$C_{36}$ dibasic acids ("dimer") 60–80% by weight;
$C_{54}$ (and higher) ("trimer") polybasic acids 10–35% by weight.

The relative ratios of monomer, dimer and trimer (or higher) in unfractionated polymeric fat acids are dependent on the nature of the starting material and the conditions of polymerization. For the purposes of this invention, the term monomeric fat acids refers to the unpolymerized monomeric acids or derivatives present in the polymeric fat acids; the term dimeric fat acids refers to the dimeric acids or derivatives (formed by the dimerization of two fat acid molecules); and the term trimeric fat acids refers to the residual higher polymeric forms consisting primarily of trimeric acids or derivatives, but containing some higher polymeric forms.

For the purposes of this invention, the terms monomeric, dimeric and trimeric fat acids, are defined further by a micromolecular distillation analytical method. The method is that of Paschke, R. E., et al., J. Am. Oil Chem. Soc., XXXI (No. 1), 5 (1954), wherein the distillation is carried out under high vacuum (below 5 microns) and the monomeric fraction is calculated from the weight of product distilling at 155° C., the dimeric fraction is calculated from that distilling between 155° C. and 250° C., and the trimeric (or higher) fraction is calculated based on the residue.

Mixtures may be fractionated by suitable means such as high vacuum distillation or solvent extraction techniques so as to obtain dimer acid cuts of greater than about 95% dimeric species by weight. It is these dimer-rich fractions which are the starting materials for the copolyamides of the present invention.

In addition to controlling the dimeric species (difunctional) content of the polymeric fat acids of the present invention, careful control must also be exercised as to the monomeric species (monofunctional) and trimeric (trifunctional) species content. Polyamides prepared with polymeric fat acids having too high a trimeric content are nearly intractable, exhibiting the extremely high melt viscosities and/or insoluble gels typical of a cross-linked polymer. The presence of sufficient monofunctional material will prevent gellation. But polyamides prepared with polymeric fat acids having too high a monomeric species content are quite poor in physical characteristics (low elongation, low tensile strength) as is typical of a low molecular weight polymer resulting from the reaction of a monofunctional "chain-stopping" component. Hence, controlled monomeric/trimeric contents are necessary to obtain optimum products. These effects, of course, are particularly noticeable in copolyamides where the proportion of polymeric fat acids employed is relatively high.

The diamine employed in the present invention is 1,4-bis-(aminoethyl)benzene.

Co-reacting dibasic acids or esters employed in the preparation of the copolyamides of the present invention are selected from compounds having the formulae $$R''OOC-COOR''$$

and $$R''-OOC-R'-COO-R''$$

where R' is an aliphatic hydrocarbon radical having from 1 to 20 carbon atoms, an alicyclic or aliphatic substituted alicyclic hydrocarbon radical having from 6 to 20 carbon atoms, an aromatic or an aliphatic substituted aromatic radical having from 6 to 20 carbon atoms and R'' is hydrogen or an alkyl group having from 1 to 8 carbon atoms. In general, R' is a divalent alkylene radical having from 2 to 12 carbon atoms. Such acids are illustrated by oxalic, malonic, adipic, pimelic, suberic, azelaic, sebacic, dodecanedioc, succinic, glutaric acids and the like. R' may also be branched, such as in dimethyl malonic acid, dimethyl succinic acid, and the heptadecanedioic acids. Illustrative of the aromatic acids are terephthalic, isophthalic, naphthalene dicarboxylic acids, and the like. Illustrative of alicyclic dicarboxylic acids are 1,4- or 1,3-cyclohexane dicarboxylic acid. R'' is generally an alkyl group such as methyl, ethyl, propyl, butyl or octyl. It is understood that other amide forming derivatives of said carboxylic acids may also be used, such as amides, nitriles, and acid chlorides.

As previously pointed out, in place of the dibasic acids or esters set forth above, amino acids or their corresponding lactams may be employed. Such amino acids may be represented by the formula $$H_2N(CH_2)_xCOOR''$$

where $x$ is an integer from 2 to 15, and R'' is as defined above. The corresponding lactams may be represented by the formula

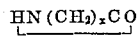

where $x$ is as defined above. In general, the most common amino acids or the corresponding lactams employed are aminocaproic acid (or epsilon-caprolactam), aminoundecanoic acid and omega-capryllactam, where $x$ is 5, 10, and 7 respectively.

Considerable variation is possible in the relative proportions of the reactants employed depending upon the particular set of properties desired in the resin. In general, the carboxyl groups attributable to the polymeric fat acids may account for from about 5 to about 90 equivalent percent of the total carboxyl groups present, the remainder being attributable to dibasic acid or amino acid present. For many applications of the resins of the instant invention, the preferable range of carboxyl groups attributable to the polymeric fat acids is from about 25 to about 90 equivalent percent of the total carboxyl groups present. As previously indicated, essentially one molar equivalent of amine is employed per molar equivalent of carboxyl present.

The mechanical properties of direct interest in the compositions of the present invention are tensile strength and elongation. These properties are measured on an Instron Tensile Tester Model TTC using ASTM D-1708-59T.

The polymer is compression molded as a 6" x 6" sheet of approximately 0.04 inch thickness, at a temperature near its melting point (usually a few degrees lower than the melting point) and at 40,000 lbs. load or higher using cellophane as the parting agent in the mold. From this sheet, test specimens are die-cut to confrom to ASTM 1708-59T.

The test specimen is clamped in the jaws of the Instron. Crosshead speed is usually 0.5 inch/minute at 100 pound full scale load. Chart speed is 0.5 inch/minute. Tensile strength (reference: ASTM D-638-52T) is calculated as:

$$\text{Tensile strength} = \frac{\text{maximum load in pounds}}{\text{cross sectional area (sq. in.)}}$$

Percent elongation is calculated as:

$$\text{Percent elongation} = \frac{\text{gage length at break minus gage length at 0 load}}{\text{gage length at 0 load}} \times 100$$

In addition to tensile strength and elongation, the following properties were measured on most of the polymers prepared:

(1) Ball and ring softening point—ASTM E28–59T.
(2) Amine and acid end groups—conventional analytical titration procedures. The results are expressed in terms of milliequivalents of acid or amine per kilogram of product (meq./keg.)
(3) Inherent viscosity—defined by equation:

$$\text{inh.} = \frac{\ln \eta \text{ rel.}}{C}$$

where C=concentration of polymer in grams per 100 ml. of solvent, ln $\eta$ rel.=natural logarithm of the relative viscosity of the dilute polymer solution. In the examples below all viscosities are measured m-cresol at 30° C., usually at a concentration of 1.0 g./100 ml.

(4) Tensile modulus—as defined in ASTM D638–60T.
(5) Toughness—this is taken as the area under the stress-strain curve. Cf. Carswell & Nason, Symposium on Plastics, ASTM, Philadelphia, February 1944, p. 23.
(6) Water absorption—as defined in ASTM D570–59aT.

The following examples will serve to further illustrate the invention in which all parts and percentages are by weight unless otherwise indicated.

Example I

Into a reactor equipped with a stirrer, thermocouple, and a distillation head was placed 283.0 g. (1.0 equivalent of the distilled polymeric fat acids prepared from tall oil fat acids) having the following analysis:

Percent Monomer (M) _____ 1.1
Percent Dimer (D) _____ 98.4
Percent Trimer (T) _____ 0.5
Saponification equivalent (S.E.) _____ 284
Neutralization equivalent (N.E.) _____ 288 and 81.8 g. (1.0 equivalent) of 1,4-bis-(β-aminoethyl) benzene.

The mixture was heated 2.0 hours at 70°–250° C., 2.0 hours at 250° C., and 2.5 hours under vacuum (ca. <1 mm. Hg.) at 250° C. The resulting polyamide had the properties as indicated in Table I.

Example II

The above example was repeated employing like materials and reaction schedule. The resulting polyamide had the properties as indicated in Table I.

Example III

Into a stainless steel reactor was placed 349 g. (1.233 equivalents) of the distilled polymeric fat acid of Example I, 83.8 g. (0.818 equivalent of sebacic acid, and 168.3 g. (2.051 equivalents) of 1,4-bis-($\beta$-aminoethyl)benzene.

The reaction schedule was similar to that of Example I. The resulting polyamide had the properties as indicated in Table I.

TABLE I

| Properties of Polyamide | Example | | |
|---|---|---|---|
| | I | II | III |
| Amine (meq./kg.) | 36 | 15 | 11 |
| Acid (meq./kg.) | 26 | 39 | 34 |
| Inherent viscosity (1 g./100 ml. m-cresol) 30° C | 0.55 | 0.60 | 0.73 |
| Ball and Ring Softening Point, ° C | 159 | 154 | >200 |
| Polymer Melt Temperature, ° C | | | 210 |
| Tensile Strength (p.s.i.) | 4,300 | 4,500 | 5,200 |
| Elongation, percent | 450 | 450 | 300 |
| Yield Stress (p.s.i.) | 3,000 | 2,600 | 4,700 |
| Tensile Modulus (p.s.i.) | 52,000 | 50,000 | 113,000 |
| Water absorption, saturated 24 hours | 0.27 | | 0.16 |

The preceding examples demonstrate the unique nature of the polyamides of the present invention which are tough compositions exhibiting excellent tensile strength combined with remarkable elongation properties. In all instances, these polyamides exhibit tensile strength in excess of 3000 p.s.i. and generally in excess of 4000 p.s.i. combined with elongations in excess of 200% and generally in excess of about 300%. The polyamides have an inherent viscosity (measured in metacresol at 30° C.) in all instances in excess of 0.50 and ball and ring melting points in excess of 150° C. The sum of the acid and amine end groups expressed in terms of milliequivalents of amine and acid per kilogram of polymer is generally less than 100. In addition to possessing the foregoing properties, the polyamides show surprising resistance to water absorption as illustrated by the examples. Thus the polyamides of the present invention possess a combination of desirable properties and provide high melting, tough and flexible compositions having improved resistance to water absorption.

The examples herein have been limited to the components of the polyamide itself. This is not meant to be limiting as to the scope of the invention and it is understood that the compositions may include stabilizers, antioxidants, pigments, fillers and the like.

The embodiments of the present invention in which an exclusive property or privilege is claimed are defined as follows:

1. A polyamide composition comprising the condensation product at temperatures of from 150–300° C. of 1,4-bis- $\beta$-aminoethyl)benzene and polymeric fat acids having a dimeric fat acids content greater than about 95% by weight, the molar equivalents of amine employed being essentially equal to the molar equivalents of carboxyl groups employed.

2. A polyamide composition as defined in claim 1 wherein said polymeric fat acids are polymerized tall oil fatty acids.

3. A polyamide composition as defined in claim 2 wherein said polymerized tall oil fatty acids have a dimeric fat acid content of 98.4% by weight.

4. A polyamide composition as defined in claim 1 wherein said polymeric fat acids are polymerized tall oil fatty acids, and further comprising sebacic acid as a coreacting dibasic acid, said 1,4-bis-($\beta$-aminoethyl) benzene being employed in an amount of 2.051 equivalents, said polymerized tall oil fatty acids being employed in an amount of 1.233 equivalents and said sebacic acid being employed in an amount of 0.818 equivalent.

5. A polyamide composition as defined in claim 4 wherein said polymerized tall oil fatty acids have a dimeric fat acid content of 98.4% by weight.

References Cited

UNITED STATES PATENTS

| 2,450,940 | 10/1948 | Couan et al. | 260—404.5 |
| 3,268,461 | 8/1966 | Jacobson | 260—404.5 X |

FOREIGN PATENTS 610,264  10/1948  Great Britain.

NICHOLAS S. RIZZO, *Primary Examiner.*

F. A. MIKA, *Assistant Examiner.*